US009227629B2

(12) United States Patent
Zollner et al.

(10) Patent No.: US 9,227,629 B2
(45) Date of Patent: Jan. 5, 2016

(54) METHOD FOR OPERATING A HYBRID DRIVE TRAIN OF A VEHICLE

(75) Inventors: Tobias Zollner, Lindau (DE); Anton Fritzer, Markdorf (DE); Patrick Peter, Kressbronn (DE); Thomas Lemp, Langenargen (DE); Alexander Pfau, Fronreute (DE); Stefan Gierer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 197 days.

(21) Appl. No.: 14/130,533

(22) PCT Filed: Jun. 14, 2012

(86) PCT No.: PCT/EP2012/061311
§ 371 (c)(1),
(2), (4) Date: Jan. 2, 2014

(87) PCT Pub. No.: WO2013/004464
PCT Pub. Date: Jan. 10, 2013

(65) Prior Publication Data
US 2014/0142796 A1 May 22, 2014

(30) Foreign Application Priority Data
Jul. 5, 2011 (DE) .......................... 10 2011 078 670

(51) Int. Cl.
*B60W 10/02* (2006.01)
*B60W 20/00* (2006.01)
(Continued)

(52) U.S. Cl.
CPC ............... *B60W 20/40* (2013.01); *B60W 10/02* (2013.01); *B60W 10/06* (2013.01); *B60W 10/08* (2013.01);
(Continued)

(58) Field of Classification Search
CPC .............. Y10T 477/26; Y10T 477/669; Y10T 477/675; B60W 10/02; B60W 10/06; B60W 10/08; B60W 10/10; B60W 10/115; B60W 20/30; B60W 20/40; B60W 2710/1005
USPC ........ 180/65.265, 65.27, 65.28, 65.285, 65.7; 477/5, 107
See application file for complete search history.

(56) References Cited

U.S. PATENT DOCUMENTS 7,472,769 B2   1/2009   Yamanaka et al.
7,658,693 B2   2/2010   Steinhauser et al.
(Continued)

FOREIGN PATENT DOCUMENTS

CN   1927612 A   3/2007
CN   1962331 A   5/2007
(Continued)

OTHER PUBLICATIONS

International Search Report Corresponding to PCT/EP2012/061311 mailed Sep. 24, 2012.
(Continued)

*Primary Examiner* — Roger Pang
(74) *Attorney, Agent, or Firm* — Davis & Bujold, P.L.L.C.; Michael J. Bujold

(57) ABSTRACT

A method of operating a vehicle hybrid drive-train in which, depending on the operating situation, the engine and electric machine either operate individually or together. The engine and the electric machine can be coupled or separated by a clutch. The engine can be started by the electric machine or a separate starting device. To co-ordinate transmission shifts and required engine starts, during a transmission shifting process, if the engine needs to be started, then based on whether the shift is an upshift, a downshift, a traction shift or an overdrive shift and also depending on the type of engine start required, it is first determined whether the shift should be completed, at least partially completed or discontinued before carrying out the start and, based on this determination, measures for continuing, at least partially continuing or discontinuing the shift process are initiated.

11 Claims, 2 Drawing Sheets

(51) Int. Cl.
  *B60W 10/06* (2006.01)
  *B60W 10/08* (2006.01)
  *B60W 10/11* (2012.01)
  *B60W 10/10* (2012.01)
  *F16H 61/16* (2006.01)
  *B60W 10/115* (2012.01)

(52) U.S. Cl.
  CPC ............... *B60W 10/10* (2013.01); *B60W 10/11* (2013.01); *B60W 20/00* (2013.01); *B60W 20/30* (2013.01); *F16H 61/16* (2013.01); *B60W 10/115* (2013.01); *B60W 20/20* (2013.01); *B60W 2710/022* (2013.01); *B60W 2710/1005* (2013.01); *Y02T 10/6286* (2013.01); *Y10S 903/93* (2013.01); *Y10T 477/26* (2015.01); *Y10T 477/669* (2015.01); *Y10T 477/675* (2015.01)

(56) References Cited

U.S. PATENT DOCUMENTS

| | | | |
|---|---|---|---|
| 8,047,959 B2 | 11/2011 | Fuechtner et al. | |
| 8,388,494 B2 * | 3/2013 | Schiele | B60K 6/48 477/101 |
| 8,475,331 B2 | 7/2013 | Kaltenbach et al. | |
| 2008/0064561 A1 * | 3/2008 | Popp | B60K 6/48 477/5 |
| 2008/0261770 A1 | 10/2008 | Tabata et al. | |
| 2009/0124452 A1 | 5/2009 | Fuechtner et al. | |
| 2009/0157269 A1 | 6/2009 | Matsubara et al. | |
| 2009/0291801 A1 * | 11/2009 | Matsubara | B60K 6/445 477/5 |
| 2009/0308673 A1 * | 12/2009 | Seel | B60K 6/48 180/65.22 |
| 2010/0125021 A1 | 5/2010 | Matsubara et al. | |
| 2011/0040432 A1 | 2/2011 | Kaltenbach et al. | |
| 2011/0198140 A1 | 8/2011 | Wallner et al. | |
| 2013/0231815 A1 * | 9/2013 | Tanishima | B60K 6/48 701/22 |
| 2013/0284125 A1 * | 10/2013 | Zollner | B60K 6/48 123/2 |
| 2015/0142282 A1 * | 5/2015 | Lee | F16H 61/0213 701/58 |

FOREIGN PATENT DOCUMENTS

| | | |
|---|---|---|
| CN | 101896386 A | 11/2010 |
| DE | 10 2004 023 673 A1 | 12/2005 |
| DE | 10 2006 001 899 A1 | 7/2007 |
| DE | 10 2006 026 601 A1 | 12/2007 |
| DE | 10 2007 001 424 A1 | 7/2008 |
| DE | 10 2007 055 828 A1 | 6/2009 |
| DE | 10 2007 055 831 A1 | 6/2009 |
| DE | 10 2007 055 832 A1 | 6/2009 |
| GB | 2 413 998 A | 11/2005 |
| WO | 2009/077323 A2 | 6/2009 |

OTHER PUBLICATIONS

Written Opinion Corresponding to PCT/EP2012/061311 mailed Sep. 24, 2012.
Chinese Office Action issued in corresponding Chinese Application No. 201280032358.1 mailed Aug. 19, 2015.

* cited by examiner

METHOD FOR OPERATING A HYBRID DRIVE TRAIN OF A VEHICLE

This application is a National Stage completion of PCT/EP2012/061311 filed Jun. 14, 2012, which claims priority from German patent application serial no. 10 2011 078 670.8 filed Jul. 5, 2011.

FIELD OF THE INVENTION

The invention concerns a method for operating a hybrid drive-train of a vehicle.

BACKGROUND OF THE INVENTION

In a hybrid vehicle, the parallel arrangement of an internal combustion engine and an electric machine in the force flow of the drive-train makes it possible, besides a mixed driving mode in which drive torques of the two drive aggregates are superimposed, to also drive under purely electric motor power or under purely internal combustion engine power. In such a parallel hybrid, the alternate connection of the electric machine and the internal combustion engine to a vehicle transmission is effected by means of separating elements and in most cases the internal combustion engine can be drive-connected to the electric machine by way of a separator clutch. The electric machine can be brought into driving connection with the vehicle transmission or the drive output by way of a second, separate clutch, by means of transmission-internal shifting elements or via a torque converter.

With a parallel hybrid drive, during practical driving operation and depending on the hybrid operating strategy applied, the driving mode of the vehicle can change frequently between internal combustion engine powered, electric motor powered and mixed-mode driving. During purely electric driving operation the electric machine is connected to the drive output, while the internal combustion engine is decoupled from the drive-train by a separating element. In such a situation, if the electric machine is to act as an integrated starter-generator and start the internal combustion engine by operating as an electric motor, then a drag start can be carried out in which, by means of the separating element, the internal combustion engine is re-engaged and accelerated to its starting rotational speed.

Alternatively, if there is a separate starting device for the internal combustion engine, an externally assisted start can be carried out in which, independently of the electric machine present for electric motor operation, the internal combustion engine can be started and brought up to a target speed and then, by means of a separating element that has to be closed, connected to the drive-train to provide drive power. A shifting strategy for the transmission stored in at least one control unit of the vehicle, and also a hybrid operation strategy for operating the internal combustion engine and the electric machine, can work in a vehicle of this type in such manner that relatively often a shift command coincides in time with a command to start the engine.

Conventionally, when a gearshift is in progress and a command for a drag start or externally assisted start is recognized, the gearshift is first taken to completion and the system then reacts to the command for the drag start or externally assisted start in order to couple the internal combustion engine to the input shaft of the transmission.

To shorten the time sequence in such situations and to improve the driving comfort and the drive dynamics, methods are already known for example from DE 10 2007 055 828 A1 and DE 10 2007 055 831 A1, in which the internal combustion engine is started even during a gearshift.

Basically, the starting of the internal combustion engine can take place both during a gear ratio change in the transmission and also separately from transmission gearshift processes and, depending on the drive-train configuration and the structure of the transmission, both with and without traction force interruption. However, in doing this it has not previously been taken into account that a transmission gearshift reasonably called for during electric motor driving may possibly no longer even be necessary during hybrid driving, i.e. when the internal combustion engine is drive-effectively coupled into the drive-train, since the electric driving mode and the hybrid driving mode are usually controlled in accordance with different shifting characteristic curves. Because of this it can happen that, for example, an upshift is initiated during electric motor driving operation, then the externally assisted or drag start is carried out, and immediately thereafter, during internal combustion engine or combined driving operation, a downshift takes place. For a driver of the vehicle this can lead to driving phenomena that are not plausibly comprehensible.

Starts of the internal combustion engine and couplings of the internal combustion engine to the transmission, which are directly time-related to transmission gearshifts, can also lead to an overall relatively time-consuming sequence that can affect the driving behavior adversely. This undesired behavior can be intensified in vehicles having automatic transmissions with a relatively large number of gears, since for reasons relating to fuel consumption and/or power, consecutive multiple shifts or nested shifts often take place, as described for example in DE 10 2006 001 899 A1 and in DE 10 2006 026 601 A1.

SUMMARY OF THE INVENTION

Against that background the purpose of the present invention is to indicate a method for operating a hybrid drive-train of a vehicle, in which shifts in a vehicle drive-train and drag starts or externally assisted starts of an internal combustion engine are better co-ordinated than previously.

The invention is based on the recognition that in a hybrid vehicle, when a drag start or externally assisted start of the internal combustion engine is demanded during electric motor driving and when a gearshift is actually in progress, it is advantageous so far as possible and reasonable not to complete the gearshift process and to carry out the drag or externally assisted start in order to avoid alternating shifts that appear illogical to the driver as a the result of switching over between the electric motor driving and internal combustion engine or combined driving operation, and possible long sequences caused by shifts and drag or externally assisted starting that follow one another consecutively and that affect driving comfort and driving performance adversely.

Accordingly, the invention starts from a method for operating a hybrid drive-train of a vehicle in which, depending on the operating situation, an internal combustion engine and an electric machine act individually or together to drive a vehicle transmission with shiftable gear ratios, wherein the internal combustion engine and the electric machine can be coupled to or separated from one another by means of a controllable separating element, and in which, starting from an electric motor driving mode, a drag start of the internal combustion engine by the electric machine or an externally assisted start of the internal combustion engine by means of a separate starting device takes place.

To achieve the stated objective the invention provides that when a shift of the vehicle transmission is in progress and it becomes necessary to drag-start or externally start the internal combustion engine, then depending on whether the shift process is an upshift, a downshift, a traction shift or an overdrive shift, and depending on the type of the internal combustion engine start required, it is first checked whether the shift process should be completed, at least partially completed or discontinued before the drag start or the externally assisted start, and depending on the result of that check, appropriate necessary measures for continuing, at least partially carrying out or discontinuing the shift process are initiated.

A drag start is understood to mean the start of an internal combustion engine by means of an electric driving machine of a hybrid drive-train and the connection of the internal combustion engine to the drive-train. An externally assisted start is understood to mean a start of the internal combustion engine by means of a separate starting device, wherein for the starting process the internal combustion engine is at first decoupled from the drive-train and then brought into driving connection with the drive-train. A separate starting device can be for example a conventional starter motor.

A shift process is understood to mean a gearshift carried out by means of shifting elements of the vehicle transmission for the purpose of changing a transmission gear ratio, such that the shift process can be a single gearshift or may consist of more than one associated, consecutive gearshifts or of individual shifts nested with one another by a particular sequence of shifting element actuations.

Accordingly, the method describes a control logic for a hybrid vehicle which, depending on the situation, decides whether during electric motor driving a transmission gearshift in progress should be completed, partially interrupted or fully discontinued, before a required drag or externally assisted start of the internal combustion engine is begun. In this way upshifts and downshifts which are unnecessary and incomprehensible to the driver, which result from a change between electric and internal combustion engine or combined driving operation, can be avoided. Furthermore, consecutive series of gearshifts and drag starts or externally assisted starts, which owing to relatively long time sequences can have an adverse effect as regards the driver's desired drive dynamics and driving comfort, can be largely avoided.

The method can provide that with certain shift processes and start requirements, first a shift blocking instruction is activated, for example by a corresponding control command to a transmission control unit, and the implementation of the drag start or externally assisted start required is at first delayed. By means of a subsequent shift blocking check the interruption of a shift is then tested.

The shift interruption can take place advantageously if a relevant current transmission rotational speed corresponds at least approximately to a synchronous speed of the currently engaged gear or a predetermined shift phase limit has not yet been exceeded. In that case the shift can be discontinued without additional effort of the engine and transmission controls and without affecting comfort during driving operation, and the intended drag start or externally assisted start can begin.

On the other hand, if during the shift process the speed is already no longer even approximately equal to the synchronous speed of the current gear, so that a shift interruption or shift discontinuation is no longer easily possible or reasonable, then the current shift is completed. In this case the drag start or externally assisted start can be carried out as soon as the new gear has been synchronized or the end of the closing process of the shifting elements involved has been reached.

A subsequent drag start can be carried out in that by means of the electric machine operating as a motor and via the closed separating element between the internal combustion engine and the electric machine, the internal combustion engine can be accelerated from rest up to a speed at which the internal combustion engine can ignite. Then the separating element is actuated in its opening direction so that the now running internal combustion engine can reach its predetermined target rotational speed without impediment. As soon as the target speed has been reached, the internal combustion engine is connected to the drive-train by the separating element which, to do this, has to be fully closed.

A subsequent externally assisted start can be carried out in that the internal combustion engine is started by a separate starting device. After being started by such an external starting device the internal combustion engine accelerates independently of its predetermined target speed. As soon as that target speed has been reached, the internal combustion engine is drive-coupled to the drive-train by the separating element which now has to be closed for this.

If the shift process consists of a plurality of consecutive or nested individual shifts, then the shift currently in progress can be carried out but all the other shifts associated with the shift process are prevented by means of the shift blocking control system. In this case a nested shift process is, as far as possible, only controlled to the extent of a single shift. In that way a possible undesired effect of the shift process on driving operation as a result of the drive change-over can be limited to a minimum.

Furthermore, it can be provided that during an upshifting process consisting of one or more upshifts, if a drag start or externally assisted start of the internal combustion engine is called for, a shift interruption check takes place.

Likewise it can be provided that during a downshift consisting of one or more downshifts, if a drag start or externally assisted start of the internal combustion engine is called for, a shift interruption check takes place.

Moreover, it can be provided that in a vehicle having a starting element integrated in the vehicle transmission, during a shift process in progress that consists of one or more overdrive downshifts, if a drag start is called for, then if necessary the vehicle transmission is first downshifted until the starting element integrated in the transmission is actively involved in the engaged gear and can be opened. This may be necessary when connecting the internal combustion engine to the transmission if the transmission input speed during overdrive operation is lower than the idling speed of the internal combustion engine, so as not to slow down the internal combustion engine to below its idling speed.

In contrast, in the case of hybrid vehicles with a hydrodynamic torque converter, a subsequent drag start can be carried out during overdrive operation and traction operation as with other downshift processes.

In the case of shift processes in progress that consist of one or more downshifts, if an externally assisted start is called for a shift interruption check and a delay of the externally assisted start are in fact not appropriate for driving operation. Thus, in such cases it can be provided that a shift process and a subsequent externally assisted start are carried out with no delay.

Furthermore, it can be provided that during a shift process in progress which consists of one or more upshifts, if an externally assisted start becomes necessary the internal combustion engine, decoupled from the drive-train, is started by the separate starting device already during the shift interruption check. In this way the time taken for shift interruption checking can be used to keep the time for changing, namely between the start demand during electric motor driving and the beginning of internal combustion engine or combined driving, as short as possible.

A further time curtailment of the drag or externally assisted start can be achieved if, during a shift process in progress, while the shift interruption is being checked, a separating element in the form of a separator clutch is filled with a pressure medium and pre-adjusted to its touch-point. The touch-point is that point in the actuation path of the separating element, at which it begins transmitting a torque. In this way, for the starting process in the case of a drag start or for connection to the drive-train in the case of a drag start or externally assisted start, the frictional force flow between the internal combustion engine and the electric machine can be established more rapidly.

BRIEF DESCRIPTION OF THE DRAWINGS

To clarify the invention the description of a drawing illustrating an example embodiment is attached. The drawings show.

DETAILED DESCRIPTION OF THE PREFERRED EMBODIMENTS

Figure 1:
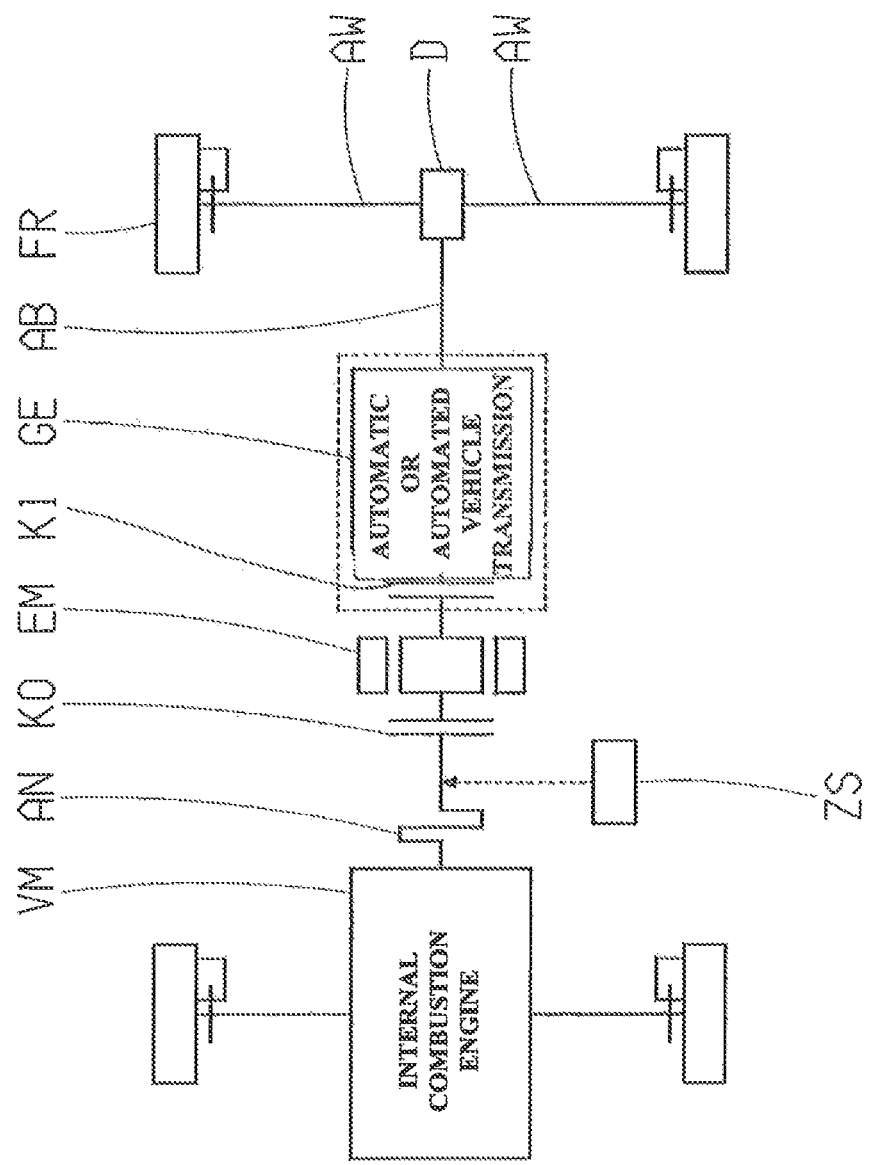
FIG. 1: A schematic representation of a hybrid drive-train of a motor vehicle.

Thus, FIG. 1 shows a greatly simplified scheme of a hybrid drive system of a motor vehicle. The parallel hybrid drive-train comprises an internal combustion engine VM, an electric machine EM and an automatic or automated vehicle transmission GE for obtaining gear ratios of the drive.

The internal combustion engine VM can be drive-coupled to or decoupled from the drive-train by means of a first controllable separating element K0, for example a hydraulically actuated friction clutch. For this, a drive input shaft AN of the internal combustion engine VM can be connected by way of the separator clutch K0 to the electric machine EM or its rotor shaft. By way of a second separating element K1 which can be another friction clutch, a torque converter, a transmission-internal shifting/starting element or the like, the electric machine EM can be drive-connected to the vehicle transmission GE. A drive torque of one or both motor aggregates VM, EM can be transmitted by way of the transmission GE to a drive output shaft AB. Via a differential transmission D, the output shaft AB drives two axle driveshafts AW that lead to vehicle wheels FR.

The electric machine EM is designed as a drive motor which, depending on the charge status of an electrical energy accumulator (not shown), enables purely electric driving of the motor vehicle. It can be operated alternatively as a motor or a generator. Moreover, the electric machine EM can be designed as an electric motor starting device for carrying out drag starts of the internal combustion engine VM. It is also possible to provide an external starting device ZS for carrying out externally assisted starts of the internal combustion engine VM independently of the electric drive motor, which can drive the drive input shaft AN of the internal combustion engine VM. The external starting device ZS can for example be an electric starter motor.

The implementation of a method for operating a hybrid drive-train will now be explained in more detail with reference to the flow chart shown in FIG. 2, the arrangement in FIG. 1 being understood to be an example for the purpose of clarifying the method.

Figure 2:
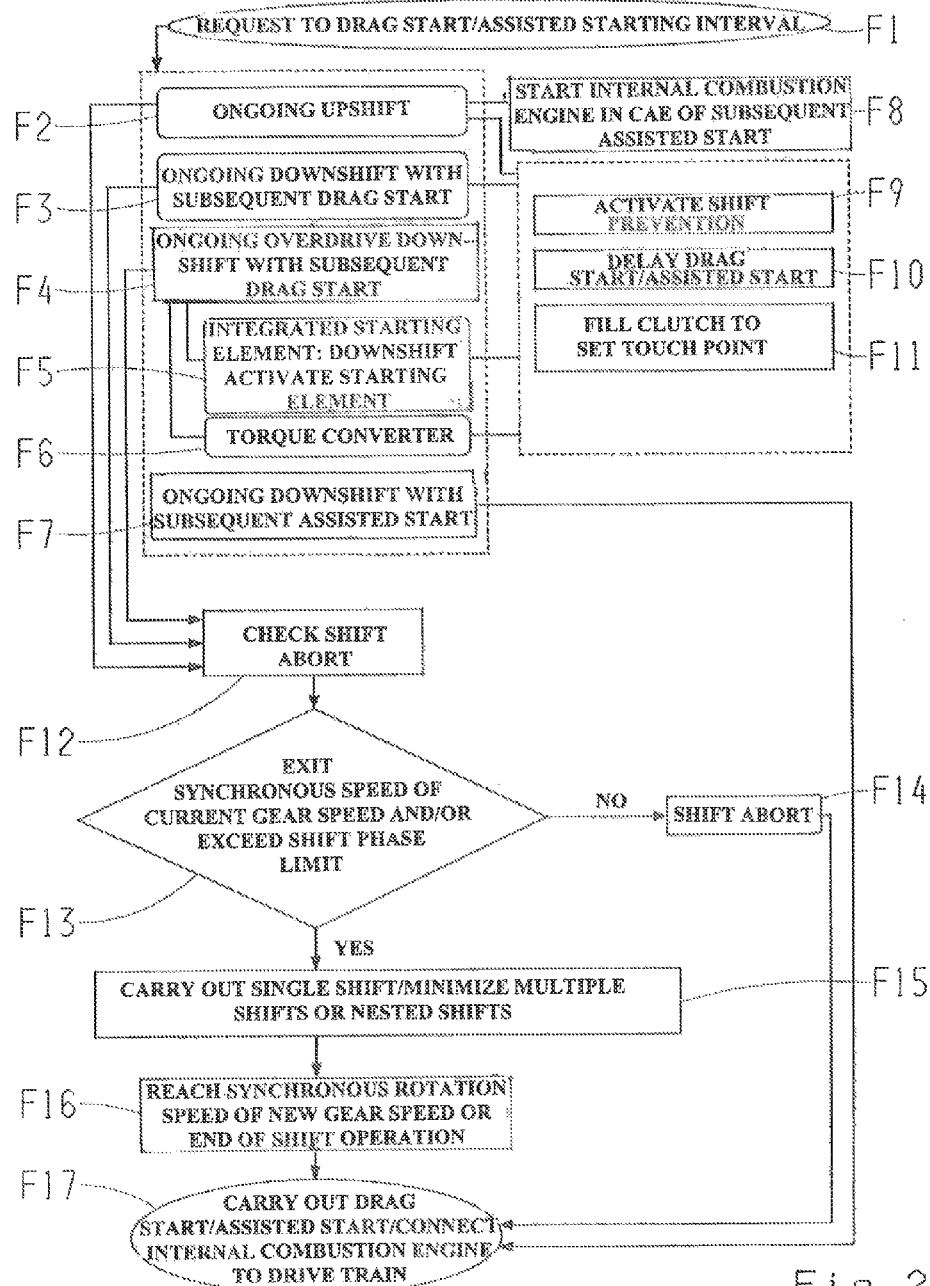
FIG. 2: A flow chart for implementing a method for the operation of a hybrid drive-train.

FIG. 2 shows function blocks F1 to F17, which serve to describe a control logic which, depending on the situation, decides whether a gearshift of the transmission GE in progress should be interrupted before a required drag start or external start of the internal combustion engine VM is carried out.

According to this, in the event of a demand F1 for a drag start or externally assisted start of the internal combustion engine VM during a shift of the transmission GE in progress for changing the gear or gear ratio, the procedure adopted depends on the type of the gearshift concerned.

When an upshift process (F2) is in progress, then if a demand for a drag start or an externally assisted start occurs a shift prevention instruction (F9) is transmitted to a transmission control unit (not described further). At the same time, provided that the shift process is still in progress and has not yet been interrupted, but at the latest until the synchronization of the new gear or the end of the gearshift is reached (F16), the drag start or externally assisted start is delayed (F10). While the shift is still in progress, the pressure chamber of the separator clutch K0 can be filled with pressure medium or hydraulic oil and adjusted to a specified or predetermined touch-point (F11).

If the vehicle has an external starting device ZS and an externally assisted start (F8) is called for, the internal combustion engine VM can in addition be started by the external starting device ZS. However, at first the internal combustion engine VM remains still drive-decoupled from the drive-train.

By means of the shift prevention instruction (F9) it is checked whether the shift in progress can be discontinued (F12). So long as during the shift, the synchronization speed of the current gear has not yet been departed from or a predetermined limit value of the shift phase has not yet been exceeded, the shift can be discontinued (F13). If this is the case, the shift is interrupted or discontinued (F14) and the drag start or externally assisted start is carried out (F17). The predetermined limit value of the shift phase can be for example a time period or a rotational speed.

If the current shift can no longer be interrupted, then that one shift is still carried out (F15). If the shift process in progress is a multiple shift consisting of a plurality of consecutive individual shifts, then all the subsequent shifts are suppressed by the activated shift block (F9). If the shift commenced is a nested shift which can no longer be interrupted, then if possible it is converted to a simple shift but otherwise it is carried out completely (F15). As soon as the shift has reached the synchronization of the new gear, or alternatively at the end of the shift (F16), the externally assisted or drag start is carried out (F17).

In a drag start, the separator clutch K0 is actuated in its closing direction so that by means of the electric machine EM the internal combustion engine VM is accelerated to a rotational speed at which the internal combustion engine VM can ignite. Then, the separator clutch K0 is actuated in its opening direction so that the now started internal combustion engine VM can reach its target speed without impediment for as jerk-free as possible a connection to the drive-train. As soon as that target speed is reached, the driveshaft AN of the internal combustion engine VM is coupled to the drive-train by closing the separator clutch K0.

In the case of an externally assisted start, the internal combustion engine VM is started by means of the external starting device ZS and accelerates autonomously, i.e. under its own internal combustion engine power, until it reaches its target speed. As soon as the target speed has been reached, the driveshaft AN of the internal combustion engine VM is coupled to the drive-train by closing the separator clutch K0.

If a downshift process is in progress during traction operation with a subsequent drag start (F3), the procedure is analogous to that in an upshift process.

If a downshift process is in progress during overdrive operation with a subsequent drag start (F4), the rest of the procedure depends on the structure of the drive-train.

In the case of hybrid vehicles in which the separating element K1 is in the form of a starting element that is integrated in the transmission GE between the electric machine EM and the transmission GE, which is also used for gearshifts, for example a transmission-internal shifting clutch, then if necessary the integrated starting element K1 is opened when the current input speed of the transmission GE is lower than the specified idling speed of the internal combustion engine VM, in order not to slow the internal combustion engine down to below its idling speed (F5). For this it is sometimes necessary to carry out overdrive downshifts of the transmission GE until a gear is reached in which the integrated starting element K1 is actively involved. Only then can the shift block (F9) be activated and the drag start initiated.

In contrast, in hybrid vehicles with a hydrodynamic torque converter as the second separating element K1 or starting element (F6), the procedure is as for traction downshifts.

In the case of a downshift process in progress during traction or overdrive operation with a subsequent externally assisted start (F7), the shift block is not activated so the downshift process is carried out immediately. At the same time the externally assisted start required is also not delayed, but carried out immediately (F17).

LIST OF INDEXES

AB Drive output shaft
AN Drive input shaft
AW Axle drive shaft
D Differential transmission
EM Electric machine
F1-F17 Function blocks
FR Vehicle wheel
GE Vehicle transmission
K0 First separating element
K1 Second separating element
VM Internal combustion engine
ZS Additional starting device

The invention claimed is:

1. A method of operating a hybrid drive-train of a vehicle in which, depending on an operating situation, an internal combustion engine (VM) and an electric machine (EM) act, either individually or together, to drive a vehicle transmission (GE) with shiftable gears, the internal combustion engine (VM) and the electric machine (EM) are engageable or disengageable by a controllable separating element (K0), and in which, starting from an electric motor driving mode, either a drag start of the internal combustion engine (VM) by the electric machine (EM) or an externally assisted start of the internal combustion engine (VM) by a separate starting device (ZS) occurs, the method comprising the steps of:

when a shift process of the vehicle transmission (GE) is in progress and a demand for either a drag start or an externally assisted start of the internal combustion engine (VM) occurs, then depending on whether the shift process is either an upshift process, a downshift process, a traction shift process or an overdrive shift process and also depending on the type of the required start of the internal combustion engine (VM), checking whether the shift process should either be completed, at least partially completed, or discontinued before the drag start or the externally assisted start is carried out, and depending on a result of the check, initiating appropriate necessary measures to continue, to at least partially complete, or to discontinue the shift process.

2. The method according to claim 1, further comprising the step of, in the case of some shift processes and start commands, first activating a shift blocking instruction, and delaying implementation of the required drag start or the externally assisted start of the internal combustion engine.

3. The method according to claim 1, further comprising the step of interrupting the shift process when either a relevant current transmission rotational speed corresponds at least approximately to a synchronous speed of a current gear or an applicable shift phase limit is not exceeded.

4. The method according to claim 1, further comprising the step of, when a shift process, which corresponds to either a plurality of consecutive or nested individual shifts, is in progress, if the check shows that a complete shift discontinuation is not possible, then carrying out the individual shift currently in progress and blocking all further shifts associated with the shift process.

5. The method according to claim 1, further comprising the step of during an upshift process in progress, consisting of at least one upshift, if the demand for the drag start or the externally assisted start of the internal combustion engine occurs, carrying out a shift interruption check.

6. The method according to claim 1, further comprising the step of during a downshift process in progress, consisting of at least one downshift, if the demand for the drag start or the externally assisted start of the internal combustion engine occurs, carrying out a shift interruption check.

7. The method according to claim 1, further comprising the step of in a vehicle comprising a starting element (K1) that is integrated in the vehicle transmission (GE), during a shift process in progress consisting of at least one overdrive downshift, if the demand for the drag start occurs, first downshifting the vehicle transmission (GE) until the integrated starting element (K1) is actively involved in the gear engaged.

8. The method according to claim 1, further comprising the step of, during a shift process in progress consisting of at least one downshift, if the demand for the externally assisted start occurs, carrying out both the shift process and the subsequent external start without delay.

9. The method according to claim 1, further comprising the step of, during a shift process in progress consisting of at least one upshift, if the demand for the externally assisted start occurs already during the checking of the shift interruption, starting the internal combustion engine (VM), which is decoupled from the drive-train, by the separate starting device (ZS).

10. The method according to claim 1, further comprising the step of during a shift process in progress, already during the checking of the shift interruption, filling a separating element (K0) with a pressure medium and pre-adjusting the separating element to a touch-point, with the separating element being a separator clutch located between the electric machine (EM) and the internal combustion engine (VM).

11. A method for operating a hybrid drive-train of a vehicle having an internal combustion engine (VM) and an electric machine (EM) that are controllably couplable, via a separating element (K0), so as to drive shiftable gears of a vehicle transmission (GE) either individually or jointly depending on an operating situation of the vehicle, the method comprising the steps of:

driving the shiftable gears of the vehicle transmission with the electric machine while the internal combustion engine is shut off;

proceeding with a gear shifting process in the vehicle transmission;

demanding starting of the internal combustion engine so that the internal combustion engine being started either by drag started, via the electric machine, or started by a separate starting device;

prior to starting the internal combustion engine, checking whether the gear shifting process should be either completed, at least partially completed or discontinued, depending on the whether the gear shifting process is an upshift process, a downshift process, a traction shift process or an overdrive shift process, and depending on whether the internal combustion engine will be drag started, via the electric machine, or started by the separate starting device; and depending on a result of the checking step, initiating measures to either complete, at least partially complete, or discontinue the gear shifting process.

* * * * *